(12) United States Patent
Aralakuppe Ramegowda et al.

(10) Patent No.: US 8,392,762 B2
(45) Date of Patent: Mar. 5, 2013

(54) SYSTEM AND METHOD FOR DETECTION AND PREVENTION OF FLASH CORRUPTION

(75) Inventors: Yogesha Aralakuppe Ramegowda, Bangalore (IN); Srinivasa R. Dangeti, Razole (IN); Puja Chopra, Bangalore (IN); Narasimha Rao Pesala, Bangalore (IN); Puri Gautam, Bangalore (IN); Shruti Kop, Bangalore (IN); Darshan Raj, Bangalore (IN); Mani Sivaraman, Bangalore (IN); Yugandhar Kumar Puppala, Bangalore (IN); Kaarthikeyan Muthusamy, Bangalore (IN); Sachin Jethe, Bangalore (IN); Mugdalbetta Rajesh Suresh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 12/025,660

(22) Filed: Feb. 4, 2008

(65) Prior Publication Data
US 2009/0199048 A1 Aug. 6, 2009

(51) Int. Cl.
*G06F 11/00* (2006.01)
(52) U.S. Cl. .................. 714/36; 714/48; 714/52; 713/1
(58) Field of Classification Search .................. 714/36, 714/54, 48, 52; 713/1
See application file for complete search history.

(56) References Cited

U.S. PATENT DOCUMENTS

| | | | | |
|---|---|---|---|---|
| 4,907,150 A | * | 3/1990 | Arroyo et al. | 713/323 |
| 5,136,711 A | * | 8/1992 | Hugard et al. | 713/2 |
| 5,509,120 A | * | 4/1996 | Merkin et al. | 726/24 |
| 5,793,943 A | | 8/1998 | Noll | |
| 6,141,683 A | * | 10/2000 | Kraml et al. | 709/220 |
| 6,263,431 B1 | * | 7/2001 | Lovelace et al. | 713/2 |
| 6,308,265 B1 | | 10/2001 | Miller | |
| 6,490,722 B1 | * | 12/2002 | Barton et al. | 717/174 |
| 6,535,992 B1 | * | 3/2003 | Cheng | 714/5.11 |
| 6,651,188 B2 | | 11/2003 | Harding et al. | |
| 6,745,329 B1 | * | 6/2004 | Kao | 726/24 |

(Continued)

FOREIGN PATENT DOCUMENTS

| | | |
|---|---|---|
| EP | 0414379 | 2/1991 |
| EP | 0426185 | 5/1991 |

(Continued)

OTHER PUBLICATIONS

Topping, "Techniques to Protect MCU Applictations AgainstMalfunction Due to Code-Run Away", "www.freescale.com", 2002, pp. 1-12, Publisher: Motorola.

(Continued)

*Primary Examiner* — Loan L.T. Truong
(74) *Attorney, Agent, or Firm* — Fogg & Powers LLC

(57) ABSTRACT

A non-volatile memory device comprises an application code sector of sufficient size to store a first copy of an application code and a second copy of the application code; and a boot sector having a boot loader code embodied therein. The boot loader code is configured to cause a processor to check the integrity of both the first and second copies of the application code; if the first copy is corrupted, overwrite the first copy of the application code with the second copy; and if the second copy is corrupted, overwrite the second copy of the application code with the first copy.

20 Claims, 4 Drawing Sheets

U.S. PATENT DOCUMENTS

| | | | |
|---|---|---|---|
| 6,757,838 B1 | 6/2004 | Chaiken et al. | |
| 6,792,528 B1 | 9/2004 | Hou | |
| 6,948,099 B1 | 9/2005 | Tallam | |
| 7,055,034 B1 | 5/2006 | Levy | |
| 7,315,940 B1 * | 1/2008 | Audette et al. | 713/2 |
| 7,409,539 B2 * | 8/2008 | Arnez et al. | 713/100 |
| 7,467,285 B2 * | 12/2008 | Khosravi et al. | 711/206 |
| 7,555,678 B2 * | 6/2009 | Lai et al. | 714/36 |
| 7,739,663 B2 * | 6/2010 | Newcomb, Jr. | 717/126 |
| 7,765,393 B1 * | 7/2010 | Lee et al. | 713/2 |
| 2001/0047497 A1 | 11/2001 | Larson et al. | |
| 2002/0129244 A1 | 9/2002 | DaCosta | |
| 2002/0191954 A1 * | 12/2002 | Beach et al. | 386/46 |
| 2003/0037099 A1 * | 2/2003 | Rygaard | 709/203 |
| 2003/0046563 A1 | 3/2003 | Ma et al. | |
| 2003/0191930 A1 * | 10/2003 | Viljoen et al. | 713/1 |
| 2004/0083346 A1 | 4/2004 | Chevallier et al. | |
| 2004/0153846 A1 * | 8/2004 | Lee | 714/42 |
| 2005/0010778 A1 | 1/2005 | Walmsley | |
| 2005/0055496 A1 | 3/2005 | Nallapa | |
| 2005/0099845 A1 | 5/2005 | Eggleston et al. | |
| 2005/0105006 A1 * | 5/2005 | Pitsch et al. | 348/729 |
| 2005/0108467 A1 | 5/2005 | Scott et al. | |
| 2005/0132129 A1 | 6/2005 | Venkiteswaran | |
| 2005/0251673 A1 * | 11/2005 | Bosley et al. | 713/2 |
| 2005/0273550 A1 | 12/2005 | Chevallier et al. | |
| 2005/0273588 A1 * | 12/2005 | Ong et al. | 713/2 |
| 2006/0080650 A1 * | 4/2006 | Winters et al. | 717/168 |
| 2006/0236198 A1 * | 10/2006 | Lintz et al. | 714/758 |
| 2006/0242702 A1 | 10/2006 | McIntosh et al. | |
| 2007/0033387 A1 * | 2/2007 | Arnez et al. | 713/1 |
| 2007/0074015 A1 * | 3/2007 | Shiiba et al. | 713/1 |
| 2007/0101119 A1 * | 5/2007 | Vesterinen et al. | 713/2 |
| 2007/0118730 A1 * | 5/2007 | Platt | 713/2 |
| 2007/0169098 A1 * | 7/2007 | Kikuchi | 717/168 |
| 2007/0191109 A1 * | 8/2007 | Crowder et al. | 463/42 |
| 2008/0040596 A1 * | 2/2008 | Mai et al. | 713/2 |
| 2008/0104381 A1 * | 5/2008 | Peacock et al. | 713/1 |
| 2008/0148061 A1 * | 6/2008 | Jin et al. | 713/187 |
| 2008/0178298 A1 * | 7/2008 | Arai et al. | 726/29 |
| 2008/0184022 A1 * | 7/2008 | Peacock | 713/2 |
| 2008/0235501 A1 * | 9/2008 | Bailey et al. | 713/1 |
| 2008/0307215 A1 * | 12/2008 | Willems | 713/2 |
| 2009/0055832 A1 * | 2/2009 | Fienblit et al. | 718/104 |
| 2009/0089570 A1 * | 4/2009 | Andrianov | 713/2 |
| 2009/0164973 A1 * | 6/2009 | Barnett et al. | 717/110 |
| 2010/0146302 A1 * | 6/2010 | Schoegler et al. | 713/193 |

FOREIGN PATENT DOCUMENTS

| | | |
|---|---|---|
| EP | 1566735 | 8/2005 |
| WO | 9932973 | 7/1999 |
| WO | 2008075646 | 6/2008 |

OTHER PUBLICATIONS

Horst et al., "The Risk of Data Corruption in Microprocessor-based Systems", Jun. 1993, pp. 576-585, Publisher: IEEE The Twenty-Third International Symposium on Fault-Tolerant Computing.

Moralee, "Memory Protection: avoiding the cancer of crashed systems", Mar. 1982, pp. 256-259, Publisher: Electronics & Power Mar. 1982.

European Patent Office, "Office Action", "From Foreign Counterpart of U.S. Appl. No. 12/025,660", Dec. 4, 2012, pp. 1-6, Published in: EP.

* cited by examiner

SYSTEM AND METHOD FOR DETECTION AND PREVENTION OF FLASH CORRUPTION

BACKGROUND

Microcontrollers in an embedded system typically include a central processing unit (CPU), non-volatile memory (such as EEPROM or flash memory), interfaces, random access memory (RAM), and other peripherals integrated onto a single integrated circuit. Hence, the number of chips, wires, and space needed is reduced compared to using separate chips. In addition, unlike general purpose microprocessors, microcontrollers are typically designed to carry out specific functions which increases their cost-effectiveness.

However, microcontrollers are vulnerable to data corruption such as corruption due to code run-away. Code run-away can be caused by faulty code, operating the Micro-Controller Unit (MCU) outside its specification or by a major electromagnetic interference (EMI) or electrical noise event. By definition, it is not well defined what will happen during code run-away, but it is caused by the out-of-specification operating environment effectively corrupting the program counter resulting in the MCU behaving unpredictably. A corrupted program counter could lead to a jump to programming code that performs the flash erase or write operation, resulting in accidental corruption of flash memory data that contains application code. Once the application code is corrupted, it is typically not possible to recover until the correct application code is programmed again.

For the reasons stated above, and for other reasons stated below which will become apparent to those skilled in the art upon reading and understanding the present specification, there is a need in the art for a system and method to detect and recover from flash corruption.

SUMMARY

The above mentioned problems and other problems are resolved by the present invention and will be understood by reading and studying the following specification.

In one embodiment, a non-volatile memory device is provided. The non-volatile memory device comprises an application code sector of sufficient size to store a first copy of an application code and a second copy of the application code; and a boot sector having a boot loader code embodied therein. The boot loader code is configured to cause a processor to check the integrity of both the first and second copies of the application code; if the first copy is corrupted, overwrite the first copy of the application code with the second copy; and if the second copy is corrupted, overwrite the second copy of the application code with the first copy.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
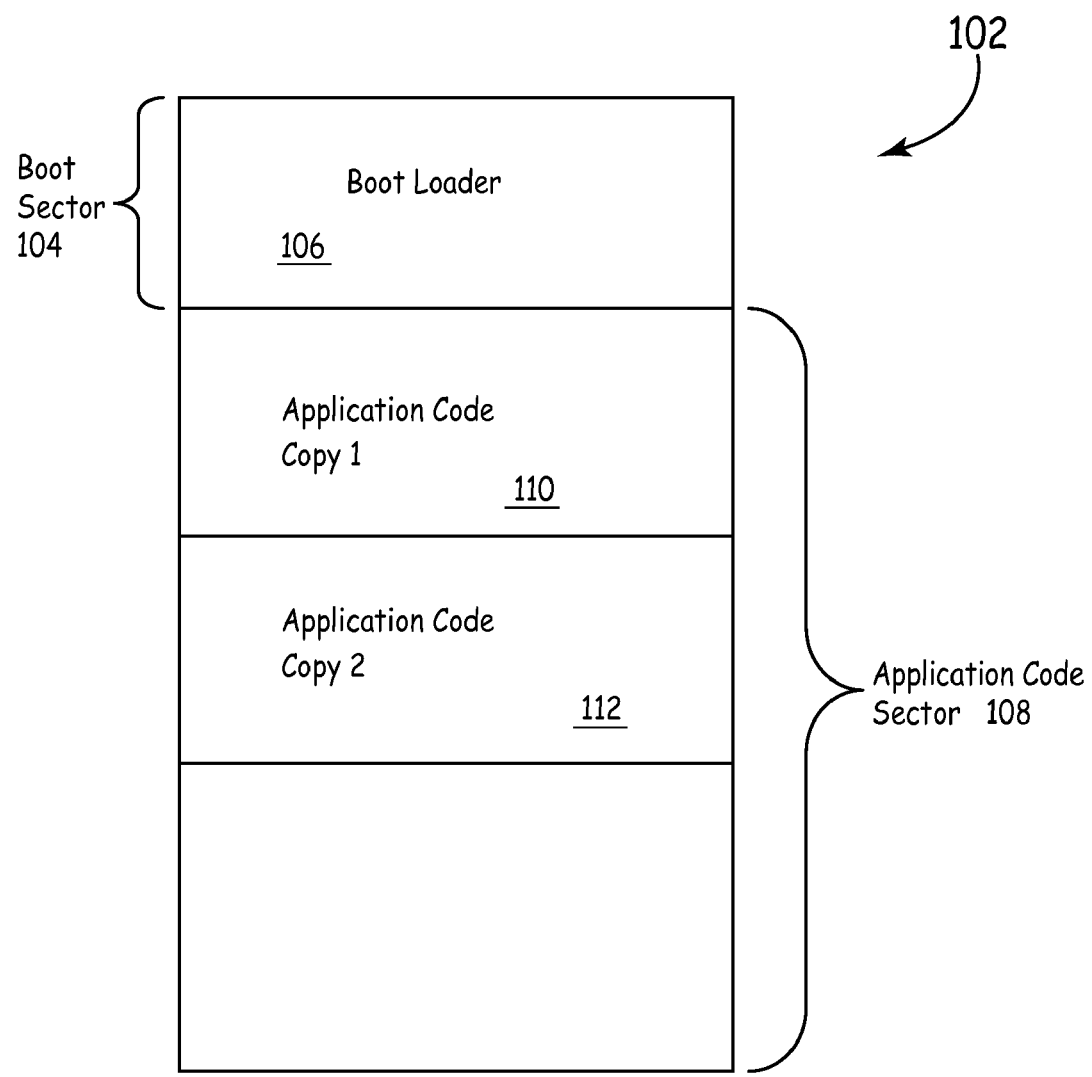
FIG. 1 is a block diagram of a non-volatile memory device according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention enable the detection and recovery of corrupted data in a non-volatile memory device, such as a Flash memory. In particular, embodiments of the present invention enable more robust detection and recovery mechanism of corrupted application code than conventional non-volatile memory devices through the use of multiple copies of the application code and modified functionality of a boot loader code also stored on the non-volatile memory device.

FIG. 1 is a block diagram of a non-volatile memory device 102 according to one embodiment of the present invention. Examples of non-volatile memory devices include, but not limited to, EEPROM and Flash memory devices. Device 102 comprises a boot sector 104 and an application code sector 108. A boot sector is defined, as used herein, as a section of memory device 102 used for storing a boot loader code. Hence, boot sector 104 contains boot loader code 106. Similarly, an application code sector 108 is defined, as used herein, as a section of memory device 102 used for storing an application code. Application code is a program which directly applies the capabilities of a microcontroller to perform a specific task. In embodiments of the present invention, application code sector 108 is of sufficient size to store two complete copies of an application code. Hence, application code sector 108 contains a first copy 110 of an application code and a second copy 112 of the same application code.

Boot loader code 106 stored on boot sector 104 is configured to cause a processor, such as processor 214 described below, executing the boot loader code 106 to check the integrity of first copy 110 and second copy 112 of the application code. In particular, the integrity of the first copy 110 and the second copy 112 is checked on each hardware and/or software reset. Hardware resets (also known as hard boots) involve removing power from memory device 102 and subsequently restoring power (e.g. a power cycle). Additionally, hardware resets also include resets in which a system is restarted without performing any shut-down procedures. A software reset (also referred to as a soft boot or warm boot) is a reset under software control without completely removing power from non-volatile memory device 102. Software resets typically include an ordered restart procedure. When either type of reset occurs, control of the processor is passed back to boot loader code 106. Boot loader code 106 then causes the processor to again check the integrity of the first copy 110 and the second copy 112.

In some embodiments, checking the integrity of the first copy 110 and the second copy 112 includes performing a Cyclic Redundancy Check (CRC) on the first copy 110 and second copy 112. However, it is to be understood that other known techniques of checking integrity can be used in other embodiments. If the first copy 110 fails the integrity check but the second copy 112 passes, boot loader code 106 causes the processor to overwrite the first copy 110 with the second copy 112. Similarly, if the second copy 112 fails the integrity check but the first copy 110 passes, boot loader code 106 causes the processor to overwrite the second copy 112 with the first copy 110. In this manner, errors in either copy are corrected with the other good copy. In some embodiments, boot loader code 106 performs an additional integrity check if either copy was overwritten to ensure the copy was overwritten successfully. Boot loader code 106 then transfers control to one of the copies.

In the event that both the first copy 110 and the second copy 112 fail the integrity check, boot loader code 106 does not cause the processor to transfer control to either copy. Instead, boot loader code 106 logs a CRC fault and retains control while waiting for an external command. In one embodiment, the additional integrity check is performed on the overwritten copy before transferring the control.

If both first copy 110 and second copy 112 pass the integrity check, boot loader code 106 causes the processor to transfer control to one of the copies based on a pre-determined default. For example, in one embodiment, if both copies pass the integrity check, control is transferred to first copy 110 by default. If only one of the copies passes the integrity check, control is transferred to the copy which passed the integrity check. In some embodiments, both first copy 110 and second copy 112 are configured to cause the processor to continue to perform integrity checks as a background process along with its normal functionality. The integrity checks are run on both copies, in some embodiments, regardless of which copy is currently being executed by the processor. In other embodiments, the integrity check is only performed on the copy with control. If the copy with control fails the integrity check, the copy logs the fault and forces a software reset. The software reset results in transferring control back to boot loader code 106 which again checks the integrity of first copy 110 and second copy 112 as described above.

Figure 2:
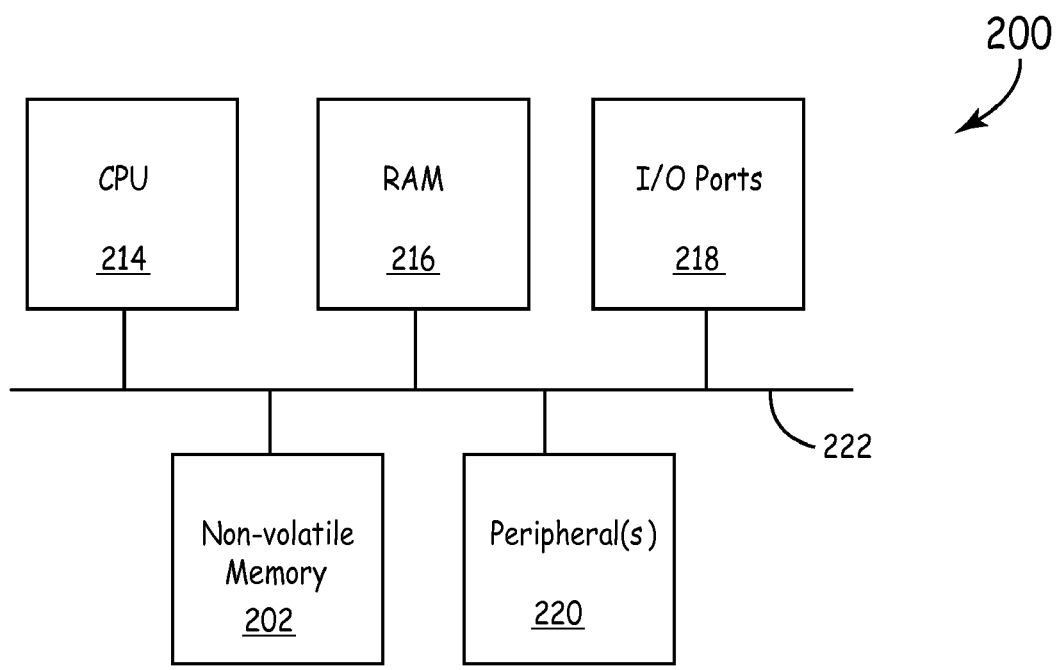
FIG. 2 is a block diagram of a microcontroller according to one embodiment of the present invention.

FIG. 2 is a block diagram of a microcontroller 200 which implements a non-volatile memory device 202 according to embodiments of the present invention. Device 202 is similar to device 102 described above. Microcontroller 200 microcontroller 200 is integrated onto a single chip and also comprises a random access memory (RAM) 216, a processor 214, and input/output ports 218. Microcontroller 200 may also contain other peripherals 220, such as a timer module, analog-to-digital converter, etc. as known to one of skill in the art.

Input/output ports 218 provide signals from/to other devices to/from microcontroller 200, such as user input devices, sensors, etc. Processor 214 processes signals received over input/output ports 218. In processing signals, processor 214 uses RAM 216 to store dynamic data used by processor 214, such as data received from input/output ports 218 and code from non-volatile memory 202.

In operation, on each hardware or software reset, processor 200 executes a boot loader code (such as boot loader code 106 in FIG. 1). The boot loader code causes the processor to check the integrity of a first copy and a second copy of application code stored on the non-volatile device 202 as described above. Thus, prior to execution of the application code, the integrity of each copy is checked and corrected. Such action prevents faulty application code from being executed on startup or after a reset. In addition, each copy of the application code is also configured to cause processor 214 to continue to check the integrity of the first and second copies as a background process. As described above, if the copy being executed does not pass the integrity check, a software reset is forced to pass control back to the boot loader code.

Figure 3:
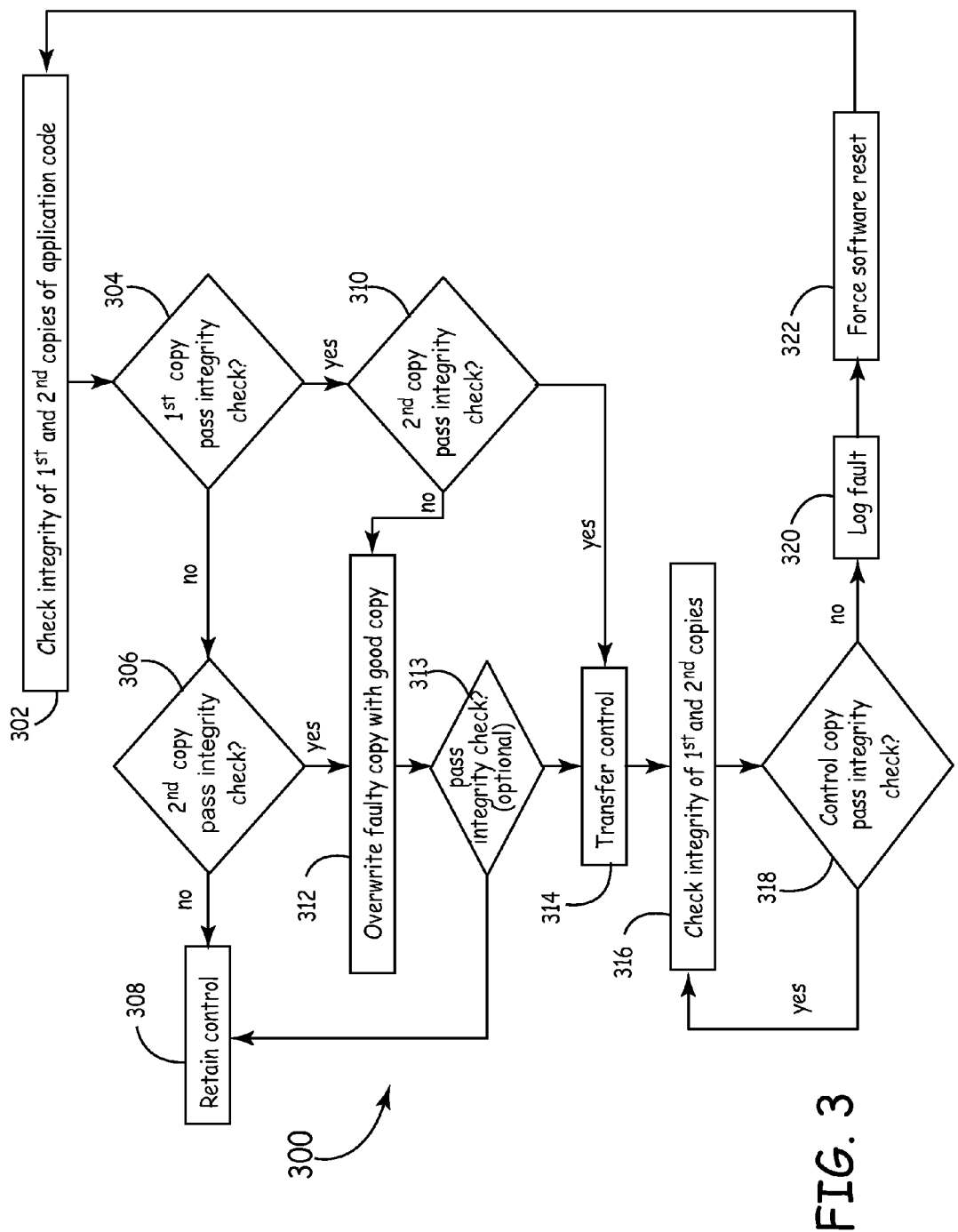
FIG. 3 is a flow chart of a method of detecting and recovering from corrupted data in a non-volatile memory device according to one embodiment of the present invention.

FIG. 3 is a flow chart depicting a method 300 of detecting and recovering from corrupted data in a non-volatile memory device, such as memory device 102, according to one embodiment of the present invention. At 302, the integrity check of a first copy and a second copy of an application code is performed. In particular, in this example a CRC is performed on both the first and second copies, as described above. In embodiments of the present invention, the initial integrity check occurs prior to transferring control of a processor to one of the first and second copies. As described above, a boot loader code is used in some embodiments to cause the processor to perform the integrity check.

At 304, it is determined if the first copy passed the integrity check. If the first copy did not pass the integrity check, it is determined at 306 if the second copy passed the integrity check. If the second copy did not pass the integrity check at 306, control is retained by the boot loader code, at 308, to wait for an external command as described above. For example, an external command is a command from a user or other device. If the second copy does pass the integrity check at 306, the faulty first copy is overwritten with the second copy at 312.

If the first copy does pass the integrity check at 304, it is determined if the second copy passed the integrity check at 310. If the second copy did not pass the integrity check at 310, the faulty second copy is overwritten with the first copy at 312. If the second copy also passed the integrity check at 310, control is transferred to one of the copies at 314. If both copies passed the integrity check, control is transferred to one of the copies as a default. For example, in one embodiment, by default, control is transferred to the first copy if both copies passed the integrity check.

If one of the copies is overwritten at 312, an optional integrity check is performed at 313 to determine if the overwrite was successful and to ensure that the copies pass the integrity check before transferring control. If the copies do not pass the integrity check at 313, control is retained at 308 as described above. If the copies do pass the integrity check at 313, control is transferred to one of the copies at 314. For example, in one embodiment, control is transferred to the second copy if the first copy was overwritten with the second copy passed at 312. Alternatively, control is passed to the first copy if the second copy did not pass the integrity check at 310.

Once control is transferred to one of the copies at 314, an integrity check is performed as a background process during execution of the copy with control at 316. In particular, each of the first copy and the second copy are configured to cause the processor to perform an integrity check on each copy. If the copy with control passes the integrity check at 318, method 300 returns to 316 where the integrity continues to be checked as a background process. If the copy with control did not pass the integrity check at 318, the processor logs the fault at 320 and forces a software reset at 322. The software reset will cause control to be returned to the boot loader code which again checks the integrity of the first and second copies at 302. Therefore, errors or corruption in either copy of the application code is detected and corrected through method 300. In addition to the detection and correction provided by method 300, in some embodiments, the boot loader code is locked or secured to prevent flash corruption. Locking or securing the boot loader code prevents changes to the boot loader code using normal write or erase commands. One manner of locking the boot loader code is described in FIG. 4.

Figure 4:
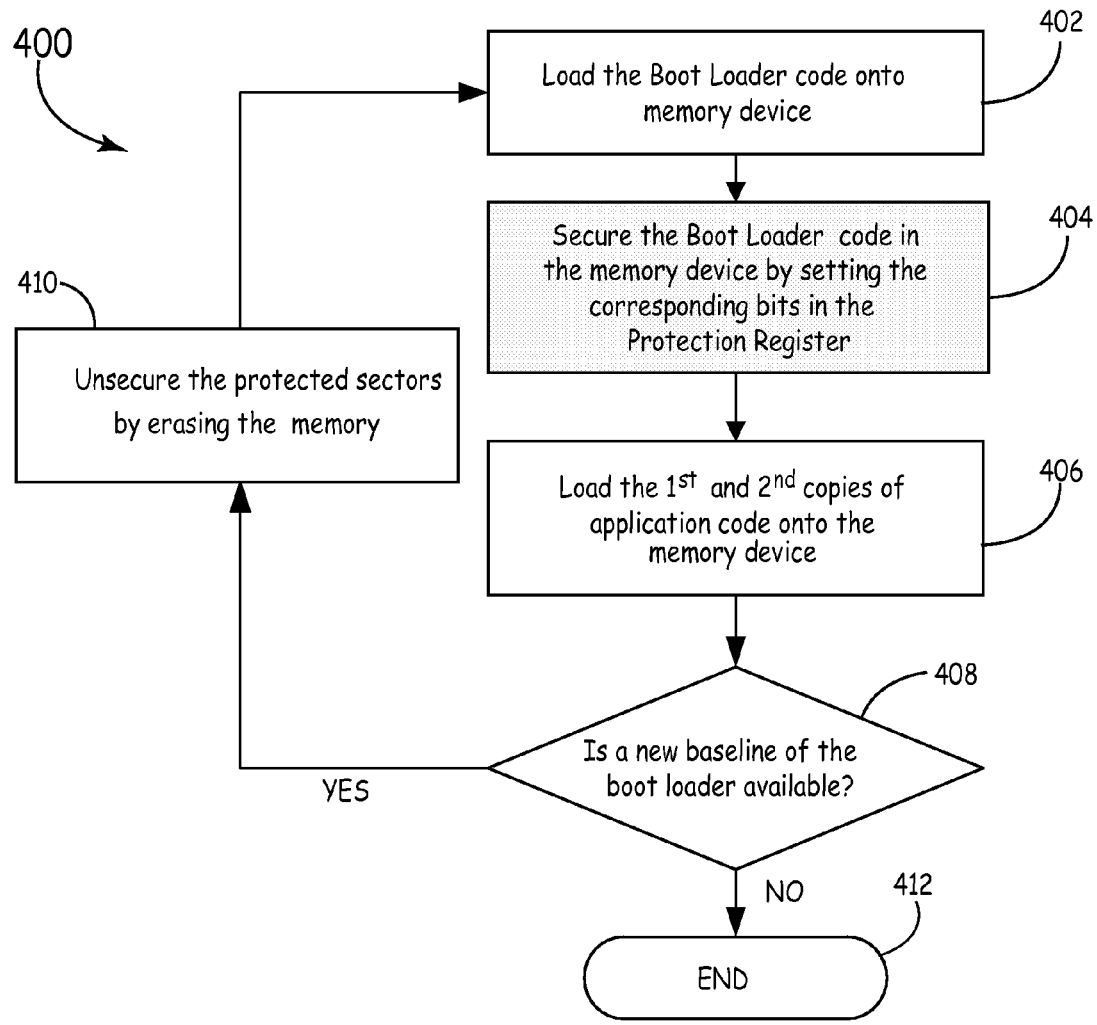
FIG. 4 is a flow chart of a method of implementing a non-volatile memory device to prevent data corruption according to one embodiment of the present invention.

FIG. 4 is a flow chart depicting a method of implementing a non-volatile memory device, such as device 102, to prevent data corruption according to one embodiment of the present invention. At 402, boot loader code is loaded onto boot sector of the non-volatile memory device. In particular, the boot loader code is loaded as part of the manufacturing process. At 404, the boot loader code is secured by setting bits in the protection register which correspond to the boot loader code. For example, in one embodiment, the protection register bits are set by an external system which loads the boot loader code onto the non-volatile memory device. In another embodiment, the boot loader code is configured to set the bits when executed.

At 406, the first and second copies of the application code are loaded onto the application code sector of the non-volatile memory device. At 408, it is periodically determined if a new baseline or released version of the boot loader code is available. If a new version is available, the boot loader code is unsecured, at 410, by erasing the memory using one of a Background Debug Module (BDM), JTAG or chip erase commands. Method 400 then returns to 402 where the new version of the boot loader code is loaded onto the boot sector of the non-volatile memory device. If a new version of the boot loader code is not available at 408, method 400 ends at 412.

Although specific embodiments have been illustrated and described herein, it will be appreciated by those of ordinary skill in the art that any arrangement, which is calculated to achieve the same purpose, may be substituted for the specific embodiment shown. For example, although the exemplary embodiments described above discuss two copies of the application code, it is to be understood that additional copies can be used in other embodiments. This application is intended to cover any adaptations or variations of the present invention. Therefore, it is manifestly intended that this invention be limited only by the claims and the equivalents thereof.

What is claimed is:

1. A non-volatile memory device comprising:
an application code sector of sufficient size to store a first copy of an application code and a second copy of the application code, wherein the application code is a program that directly applies the capabilities of a processor to perform a specific task, wherein the first copy of the application code and the second copy of the application code cause the processor to perform integrity checks on both the first and second copies of the application code; and
a boot sector having a boot loader code embodied therein, the boot loader code configured to cause the processor to:
check the integrity of both the first and second copies of the application code;
if the first copy is corrupted, overwrite the first copy of the application code with the second copy;
if the second copy is corrupted, overwrite the second copy of the application code with the first copy;
transfer control to either the first or second copy of the application code, wherein a copy of application code to which control is transferred is a control copy; and
wherein a second integrity check performed by the control copy causes control to be passed back to the boot loader code upon the failure of the second integrity check on the control copy.

2. The non-volatile memory device of claim 1, wherein the boot loader code is configured to cause the computer processor to check the integrity of both the first and second copies of the application code at each reset.

3. The non-volatile memory device of claim 1, wherein the non-volatile memory device is a flash memory device.

4. The non-volatile memory device of claim 1, wherein the boot loader code is further configured to cause the processor to:
transfer control to the first copy of the application code if the first copy is not corrupted;
transfer control to the second copy of the application code if the second copy is not corrupted and the first copy is corrupted; and
retain control with the boot loader code to await an input if both the first and second copies of the application code are corrupted.

5. The non-volatile memory device of claim 1, wherein the boot loader code is configured to cause the processor to check the integrity of both the first and second copies of the application code by performing a CRC check on each of the first and second copies.

6. The non-volatile memory device of claim 1, wherein the boot sector is locked to prevent changes to the boot loader code.

7. A microcontroller comprising:
a non-volatile memory device comprising:
an application code sector having a first copy of an application code and a second copy of the application code stored therein, wherein the application code is a program that directly applies the capabilities of the microcontroller to perform a specific task; and
a boot sector having a boot loader code stored therein;
a processor configured to:
execute the boot loader code, wherein the boot loader code is configured to cause the processor to:
check the integrity of both the first and second copies of the application code;
if the first copy is corrupted, overwrite the first copy of the application code with the second copy;
if the second copy is corrupted, overwrite the second copy of the application code with the first copy;
transfer control to either the first or second copy of the application code, wherein a copy of application code to which control is transferred is a control copy; and
execute the control copy, wherein the control copy is configured to cause the processor to check the integrity of both the first and second copies of the application code during execution and the control copy transfers control to the boot loader code upon the failure of an integrity check on the control copy.

8. The microcontroller of claim 7, wherein the boot loader code is configured to cause the processor to check the integrity of the first and second copies by performing a CRC on each of the first and second copies of the application code.

9. The microcontroller of claim 7, wherein the non-volatile memory device is a flash memory device.

10. The microcontroller of claim 7, wherein the boot loader code is further configured to cause the processor to:
check the integrity of both the first and second copies of the application code after overwriting one of the first and second copies and prior to transferring control of the processor to one of the first and second copies.

11. The microcontroller of claim 7, wherein the boot loader code is further configured to cause the processor to:
   transfer control to the first copy of the application code if the first copy is not corrupted;
   transfer control to the second copy of the application code if the first copy is corrupted and the second copy is not corrupted; and
   retain control with the boot loader code to await an input if both the first and second copies of the application code are corrupted.

12. The microcontroller of claim 11, wherein each of the first and second copies of the application code are configured to cause the processor to check the integrity of the first and second copies by performing a CRC on each of the first and second copies of the application code during execution.

13. The microcontroller of claim 11, wherein each of the first and second copies of the application code are configured to cause the processor to transfer control to the boot loader code by forcing a reset.

14. The microcontroller of claim 7, wherein the boot loader code is configured to cause the processor to check the integrity of both the first and second copies of the application code at each reset.

15. A method of detecting and recovering from corrupted data in a non-volatile memory device, the method comprising:
   checking the integrity of a first copy of an application code stored in the non-volatile memory device, wherein the application code is a program that directly applies the capabilities of a processor to perform a specific task;
   checking the integrity of a second copy of the application code stored in the non-volatile memory device;
   if the first copy fails the integrity check and the second copy passes the integrity check, overwriting the first copy with the second copy and transferring control of a processor from a boot loader code to the second copy, wherein the second copy becomes a control copy;
   if the first copy passes the integrity check and the second copy fails the integrity check, overwriting the second copy with the first copy and transferring control of the processor from the boot loader code to the first copy, wherein the first copy becomes the control copy; and
   performing a second integrity check of the first and second copies by the control copy, wherein the control copy transfers control to the boot loader code upon the failure of the second integrity check on the control copy.

16. The method of claim 15, wherein checking the integrity of the first and second copies comprises performing a Cyclic Redundancy Check (CRC) on the first and second copies.

17. The method of claim 15, further comprising:
   if both the first and second copies fail the integrity check, maintaining control of the processor with the boot loader code.

18. The method of claim 15, further comprising:
   setting one or more bits in a protection register corresponding to the boot loader code to prevent changes to the boot loader code.

19. The method of claim 15, further comprising
   if the copy with control of the processor fails the integrity check, forcing a software reset to transfer control back to the boot loader code.

20. The method of claim 15, wherein checking the integrity of the first and second copies comprises checking the integrity of the first and second copies on every hardware and software reset.

* * * * *